United States Patent
Reimelt et al.

(12)

(10) Patent No.: US 7,965,087 B2
(45) Date of Patent: Jun. 21, 2011

(54) METHOD FOR ASCERTAINING AND MONITORING FILL LEVEL OF A MEDIUM IN A CONTAINER

(75) Inventors: Ralf Reimelt, Freiburg (DE); Herbert Schroth, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 281 days.

(21) Appl. No.: 12/226,432

(22) PCT Filed: Apr. 13, 2007

(86) PCT No.: PCT/EP2007/053599
§ 371 (c)(1),
(2), (4) Date: Mar. 6, 2009

(87) PCT Pub. No.: WO2007/122116
PCT Pub. Date: Nov. 1, 2007

(65) Prior Publication Data
US 2009/0302867 A1 Dec. 10, 2009

(30) Foreign Application Priority Data

Apr. 21, 2006 (DE) .......................... 10 2006 019 191

(51) Int. Cl.
*G01R 31/11* (2006.01)
*G01R 27/04* (2006.01)
*G01F 19/00* (2006.01)
(52) U.S. Cl. ......... 324/533; 324/642; 324/644; 73/1.73; 73/290 R
(58) Field of Classification Search .................. None
See application file for complete search history.

(56) References Cited

U.S. PATENT DOCUMENTS

| 6,679,115 B2 * | 1/2004 | Heidecke ..................... 73/290 V |
| 6,867,729 B2 | 3/2005 | Berry |
| 7,012,437 B2 * | 3/2006 | Klofer .......................... 324/642 |

FOREIGN PATENT DOCUMENTS

| DE | 42 41 910 C2 | 6/1994 |
| DE | 693 27 953 T2 | 8/2000 |
| EP | 0 534 654 A2 | 3/1993 |
| EP | 1 020 735 A2 | 7/2000 |
| GB | 2 164 151 A | 3/1986 |

OTHER PUBLICATIONS

Peter Devine, "Radar Level Measurement—The User's Guide", Vega Controls, 2000.

* cited by examiner

*Primary Examiner* — Minh N Tang
(74) *Attorney, Agent, or Firm* — Bacon & Thomas, PLLC (57) ABSTRACT

A method for ascertaining and monitoring the fill level of a medium in a container the method utilizes a fill-level measuring device, wherein, according to the technique of time-domain reflectometry, high-frequency measuring signals are guided via at least one measuring probe in the direction of the medium, reflected on at least one interface of the medium as wanted echo signals or on disturbance locations as disturbance echo signals, and received. A current echo curve is formed from a produced, reference echo signal, wanted echo signals and disturbance echo signals, wherein, at least from a first disturbance echo signal and the reference echo signal, which are caused in a measurement-inactive region of the fill-level measuring device, a base point is located in the current echo curve, and wherein the fill level is ascertained from the distance between the base point and the wanted echo signal formed in a measurement-active region of the fill-level measuring device.

18 Claims, 3 Drawing Sheets

METHOD FOR ASCERTAINING AND MONITORING FILL LEVEL OF A MEDIUM IN A CONTAINER

TECHNICAL FIELD

The invention relates to a method for ascertaining and monitoring fill level of a medium in a container by application of a fill-level measuring device, wherein, according to the technique of time-domain reflectometry, high-frequency measuring signals are guided via at least one measuring probe in the direction of the medium, reflected on at least one interface of the medium as wanted echo signals or reflected on disturbance locations as disturbance echo signals, and received.

BACKGROUND DISCUSSION

Corresponding methods for ascertaining and monitoring fill level in a container are utilized frequently in measuring devices of automation- and process-control-technology. Produced and sold by the assignee, for example, are measuring devices under the mark Levelflex, which work according to a travel-time measuring method and serve to determine and/or monitor the fill-level of a medium in a container. In the method of guided microwaves, or the time-domain reflectometry (TDR) measuring technique, a high-frequency measuring signal, such as e.g. a high-frequency pulse, is transmitted along a waveguide, and, at a jump in the dielectric constant of the medium surrounding the waveguide, reflected back, at least partially, as an echo signal. On the basis of the time period, or travel time, between the transmitting of the high-frequency pulses and the receipt of the reflected, echo signals, taking into consideration the propagation velocity of the high-frequency measuring signal, the distance from the measuring device to the surface of the medium can be ascertained. Given the geometry of the container interior, then the fill-level of the medium is ascertained as a relative or absolute quantity. An advantage of time-domain reflectometry is its almost complete independence of product characteristics such as density, dielectric constant or conductivity, of process conditions such as unsettled surfaces or foam formation, as well as its independence of properties of the container, such as form, size or installed objects.

The travel-time measuring method can be divided essentially into two methods of ascertainment: The first method rests on a measurement of the travel-time, which a pulse sequence, modulated signal requires for the traveled path; while a second widely distributed method of ascertainment rests on determining the frequency difference between the currently transmitted, continuously frequency-modulated, high-frequency signal and the received, reflected, high-frequency signal (FMCW—Frequency-Modulated Continuous Wave). In general, no limitation to a certain method of ascertainment is intended in the following explanations.

In today's state of the art, there are various approaches for determining exact position of the fill-level-representing, wanted echo signal in the ascertained echo curve or the digitized envelope curve. An exact determining of the measured position of the fill level in the echo curve depends, however, on the accuracy of measurement reachable with this echo measuring principle under the given measuring conditions. One approach for determining the fill-level is, in such case, to select that echo signal, which has the largest amplitude, as the wanted echo signal in the echo curve. Under real measuring conditions, it is, however, often not possible to determine the exact fill-level in the container, since, for example, the base point cannot be determined exactly and/or the travel time of the measuring signal varies along the waveguide.

In a fill-level measuring device, most often, a reference reflection is taken into consideration for ascertaining the base point of the travel time measurement. Suited as reflection locations are local changes on the waveguide or in the vicinity of the waveguide, such as e.g. changes of the cross section of metal or dielectric structures in the form of thickening, necking or other irregularity, changes of the dielectric properties at locations where the electrical field is different from zero, changes of the magnetic properties at locations where the magnetic field is different from zero, and/or changes of the conductivity at locations where the electrical current density is different from zero.

In the case of a TDR-measuring method utilizing a waveguide, either the transmission pulse itself is used as base point, such being illustrated in U.S. Pat. No. 3,424,002 and in U.S. Pat. No. 3,995,212, or a disturbance reflection within the measurement-inactive part of the sensor is used, such as disclosed in EP 0 780 664 A2. A further opportunity for establishing the base point of the TDR-measuring method utilizing a waveguide is to use the disturbance location at the transition from the measurement-inactive area to the measurement-active area of the measuring probe or waveguide, the so called "fiducial", as base point, such as described in U.S. Pat. No. 3,474,337 and in DE 44 04 745 A1. Moreover, a further method is disclosed in U.S. Pat. No. 5,345,471, where a defined disturbance location at the transition from the measurement-inactive area to the measurement-active area of the waveguide establishes this base point using a switched resistive component between the measuring probe and the flange or the outer conductor.

A further application of disturbance locations on waveguides, or measuring probes, is the calibration of the travel time of the measuring signals along the waveguide of a fill-level measuring device. These disturbance locations are, most often, brought about by a changing of the measuring-probe geometry. For calibrating a travel-time measurement utilizing a TDR-fill-level measuring device, a number of disturbance locations on the waveguide can be applied. These disturbance locations are, for example, located in the measurement-active area of the sensor, such as especially shown in U.S. Pat. No. 3,398,578, EP 0 534 654 B1 and U.S. Pat. No. 3,474,337 involving separators on a coaxial measuring probe as reference markers. As a further opportunity for calibrating a travel-time measurement utilizing a TDR-fill-level measuring device, two disturbance locations can be used, wherein one is located at the transition from the measurement-inactive region to the active area and one in the measurement-active region, such as mentioned in U.S. Pat. No. 3,474,337 and U.S. Pat. No. 5,249,463, or wherein one is arranged in the measurement-inactive area of the sensor and one in the measurement-active region, such as shown in U.S. Pat. No. 6,867,729 B2.

Another way than by changes in geometry of the waveguide is to produce a disturbance location for calibrating the travel time by, as disclosed in U.S. Pat. No. 5,376,888, providing controllable PIN-diodes as reference markers between the conductors of a multi-conductor probe.

For effective diagnosis and calibration of a TDR-fill-level measuring device, both the fill-level echo and the base point, as well as also the reflections of the disturbance locations must be exactly and reliably determined. In U.S. Pat. No. 6,867,729 B2, in this connection, via a switchable amplifier, alternately, a disturbance-location echo in the active area of the sensor and a fill-level echo are ascertained. In such case, it is attempted, in the case of changing amplitude of the fill-level echo, as caused, for example, by a changing DK-value of the medium, to perform, nevertheless, an, in some respects, exact determining of the position of the fill-level echo, via a window discriminator, or "constant-fraction-discriminator" (CFD).

Disadvantageous in the case of all these ways of determining fill level is that the base point is dependent on process conditions and measuring conditions, whereby the fill-level of the medium in a container can, due to an undefined base point, or zero point, not be determined exactly.

SUMMARY OF THE INVENTION

An object of the invention is to provide a method, with which an exact determining of the fill level, and, thus, an increased measurement certainty and reliability of the measuring, is achieved with the fill-level measuring device.

This object is achieved according to the invention by a method for ascertaining and monitoring fill level of a medium in a container utilizing a fill-level measuring device, wherein, according to the technique of time-domain reflectometry, high-frequency measuring signals are guided via at least one measuring probe in the direction of the medium, reflected on at least one interface of the medium as wanted echo signals or on disturbance locations as disturbance echo signals and reflections, are received, which method includes steps as follows: Forming a reference echo signal in a measurement-inactive area of the fill-level measuring device either from a transmission pulse of the high-frequency measuring signal or from a disturbance echo signal; forming from the wanted echo signals, the reference echo signal and disturbance echo signals, a current echo curve as a function of travel time or traveled distance; locating, at least from a first disturbance echo signal and the reference echo signal, which are both caused in the measurement-inactive area of the fill-level measuring device, a base point in the current echo curve; and ascertaining fill-level from the distance between the wanted echo signal, formed in a measurement-active area of the fill-level measuring device, and the base point in the current echo curve.

In a preferred embodiment of the method of the invention, a rough determining of the base point is performed on the basis of the reference echo signal having a first, high amplitude.

Another preferred form of embodiment of the method of the invention performs a fine determining of the base point on the basis of the first disturbance echo signal having a second, smaller amplitude.

In a further, preferred embodiment of the method of the invention, the current echo curve is shifted for locating the base point by shifting the first disturbance echo signal of the current echo curve to a predetermined initial position of the first disturbance echo signal.

In the case of an additional preferred form of embodiment of the method of the invention, one starts from the fact that position and amplitude of the first disturbance echo signal and/or of the base point are continuously stored as data.

Further preferred forms of embodiment of the method of the invention provide, that, from the data, behavior and changes in amplitude of the first disturbance echo signal or of the base point, are ascertained and presented as a function of time.

A supplementing form of embodiment of the method of the invention provides, that the shifted echo curve is cyclically, event-controlled or manually stored as historical, echo curve data.

In the case of a further preferred form of embodiment of the method of the invention, the shifted echo curve is presented together with the stored, historical echo curve.

Other preferred forms of embodiment of the method of the invention take into consideration, that, on the basis of determining distance and/or curve of the reference echo signal and of the first disturbance echo signal in the current echo curve and/or shifted echo curve, a function-diagnosis of the fill-level measuring device is performed.

In another preferred form of embodiment of the method of the invention, in a measurement-active area of the fill-level measuring device, at least a third disturbance echo signal is determined in the current echo curve and/or shifted echo curve.

An embodiment of the method of the invention provides, that a calibration of the propagation velocity of the high-frequency measuring signals in the gas phase above the fill level of the medium is performed on the basis of the distance, and/or on the basis of the curve, between the third disturbance echo signal and the base point.

In an additional form of embodiment of the invention, the ascertained fill-level is corrected on the basis of the calibrated propagation velocity of the high-frequency measuring signals in the gas phase.

Another preferred form of embodiment of the invention involves the case, in which the disturbance echo signals, the reference echo signal and/or the wanted echo signals are ascertained on the basis of at least one search step in at least one predetermined search window of the current echo curve.

In an additional, preferred form of embodiment of the method of the invention, in a first search step, the large reference echo signal is ascertained in a first search window of the current echo curve, in a second search step, the first disturbance echo signal is ascertained in a second search window of the current echo curve, in a third search step, the third disturbance echo signal is ascertained in a third search window of the current echo curve and/or, in a fourth search step, the wanted echo signal is ascertained in a fourth search window of the current echo curve. The advantage of the predetermined regions of the initial positions of the echoes lies therein, that one can unequivocally assign the different echoes, independently of their amplitude and sign.

A preferred embodiment of the method provides, especially, that ascertainment of the disturbance echo signals, the reference echo signal and/or the wanted echo signals in the search steps in the predetermined search windows of the current echo curve occurs simultaneously.

In an advantageous form of embodiment of the method of the invention, it is provided, that the search windows are produced in a predetermined width and in a predetermined, symmetric or asymmetric arrangement about a predetermined initial position.

An advantageous form of embodiment of the method of the invention is to be seen in the fact that the locating of the base position, the calibration of the propagation velocity and/or the function-diagnosis of the fill-level measuring device is started manually by the operator.

An alternative, advantageous embodiment of the method of the invention provides, that the locating of the base position, the calibration of the propagation velocity and/or the function-diagnosis of the fill-level measuring device is started automatically in predetermined cycles or under event-control.

BRIEF DESCRIPTION OF THE DRAWINGS

The invention will now be described and explained in greater detail with reference to preferred examples of embodiments and the appended drawings, the figures of which show as follows.

DETAILED DISCUSSION

Figure 1:
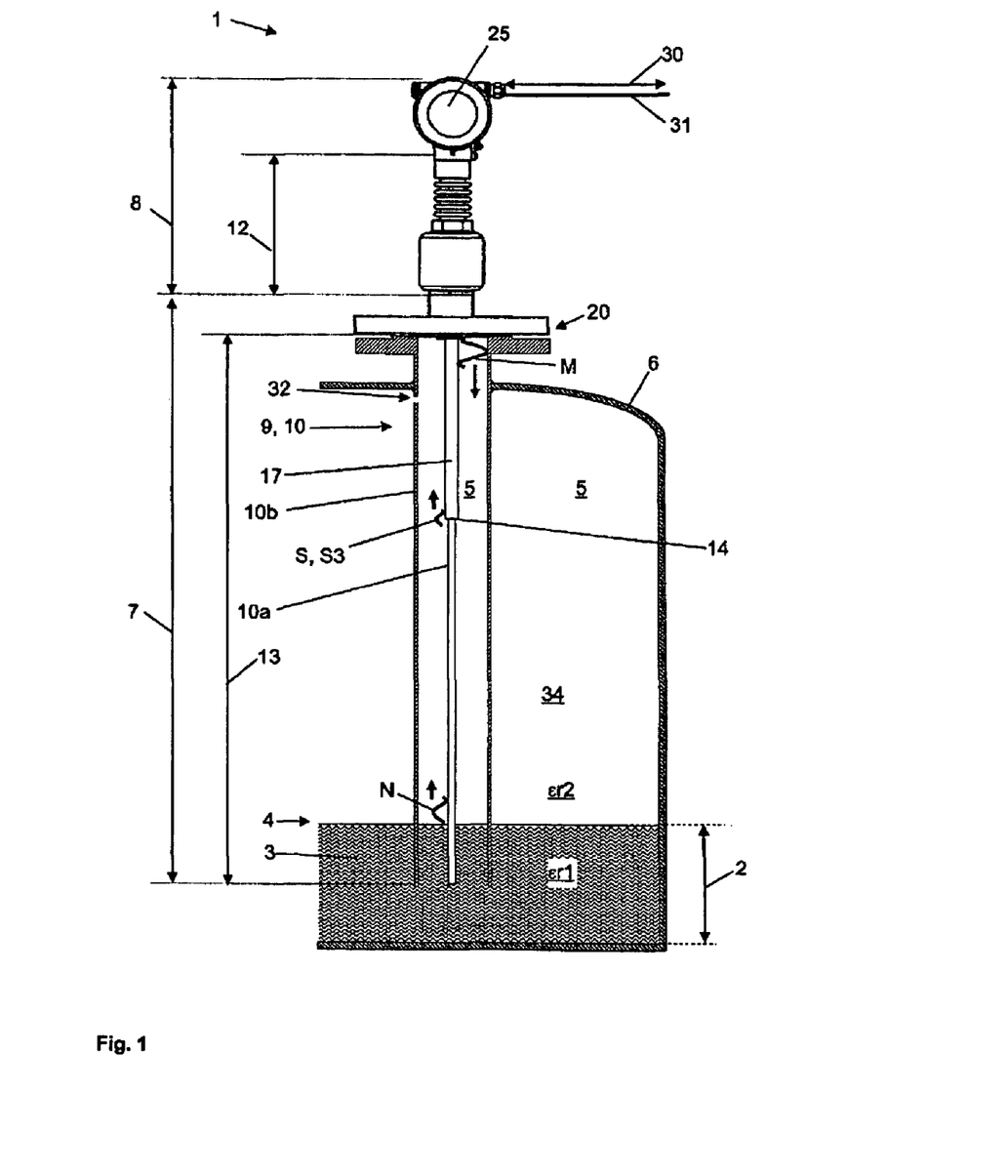
FIG. 1 an example of an embodiment of a fill-level measuring device, which, according to the principle of time-domain reflectometry, transmits and receives high-frequency measuring signals via a measuring probe.

FIG. 1 shows a fill-level measuring device 1 in the form of a time-domain reflectometer or TDR-measuring system for ascertaining continuous fill level 2 of a medium 3 in the process space 34 of a container 6. The fill-level measuring devices 1 is composed of a measurement-active area 7, which involves the process, including contact with the medium 3 and the gas phase superimposed thereon in the process space 34, and a measurement-inactive area 8, including a probe coupling region 12 separated from the process space 34 and a measurement transmitter 25 also separated from the process space 34. This fill-level measuring device 1 is applied to the container 6, for example, via a flange 20 and/or via a process thread 19. By way of a probe coupling region 12 embodied in the form of a coaxial system, the high-frequency measurement signal HF produced in the HF-unit 26 of the measurement transmitter 25 is in- and out-coupled into and out of the measuring probe 9 located in the process space 34 of a container 6. The waveguide 9 is embodied, in this illustration, as a coaxial probe 10, composed of an outer conductor 10b and an inner conductor 10a. However, also other forms of embodiment of waveguide 9, such as e.g. a Sommerfeld-waveguide (single-wire waveguide), a Goubau-waveguide (single-wire-waveguide with dielectric coating), a Lecher-line (two-wire-waveguide), a microstrip waveguide or a hollow conductor with any, rectangular or round, cross sections, are usable in this method.

Inner conductor 10a of the measuring probe 9 in FIG. 1 includes, starting from the probe coupling region 12, a measuring probe thickening 17. Machined into this measuring probe thickening 17 is e.g. a measuring probe threading 16, so that a correspondingly threaded measuring probe 9 or a correspondingly threaded waveguide 9 in the form of a rod or a cable of desired length can be screwed on.

Figure 2:
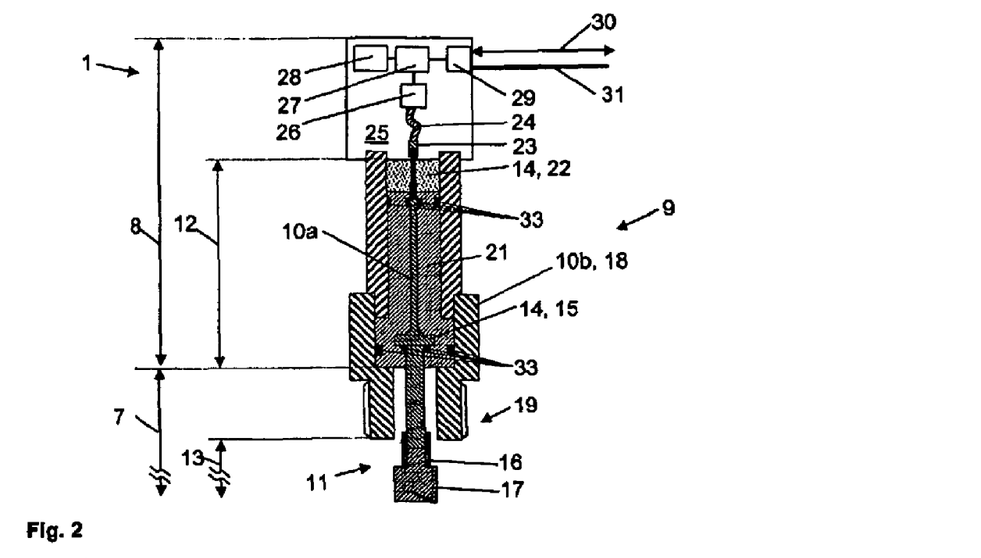
FIG. 2 an enlarged section of the fill-level measuring device shown in FIG. 1, including measuring probe and measurement transmitter.

An enlarged section through the waveguide 9 and the measurement transmitter 25 of the fill-level measuring device 1 shown in FIG. 1 is provided in FIG. 2.

The TDR-measuring method works according to the following measuring principle: Via the measuring probe 9, high-frequency measuring signals HF are transmitted as transmission pulse M in the direction of the medium 3 or into the process space 34. This transmission pulse M is reflected back either due to a DK-value jump, or a discontinuity of the dielectric constant $\epsilon r$ of the material surrounding the measuring probe 9, as wanted echo signal N, or, due to a change in the geometry of the waveguide 9, partially as disturbance echo signal S. A discontinuity of the wave resistance is present, for example, at the interface 4 of the medium 3, when the dielectric constant $\epsilon r2$ of the gas phase 5 superimposed on the medium 3, being, especially in the case of air, $\epsilon r2 \approx 1$, is smaller than the dielectric constant $\epsilon r1$ of the medium 3. With the help of the measured travel time t and knowledge of the propagation velocity of the high-frequency measuring signals HF, using a converted formula, the traveled, single-trip distance x is ascertained. The fill-level 2 of the medium 3 in the container 6 equals the height of the container 6, or the site of the coupling of the high-frequency measuring signals HF into the waveguide 9, as the case may be, minus the traveled, single-trip distance x of the high-frequency measuring signals HF. Since the height of the container 6 is known, thus, the fill-level 2 in the container 6 can be determined.

The high-frequency measuring signals HF, or the electromagnetic waves, propagate almost with the speed of light, so that very short travel times t result. In the case of a resolution in the measuring of the fill level 2 of one millimeter, differences in the travel time t of about 10 pico-seconds are ascertained. The measuring of these short times is only possible using special electronic components and high measuring effort. Therefore, most often, the reflected echo curve signal E, which includes at least the wanted echo signal N and the disturbance echo signals S, is transformed, by means of a sequential sampling, into a low frequency range in the form of an intermediate frequency signal. This intermediate frequency signal is produced, for example, by the mixer principle, from a transmission pulse signal and a sampling pulse signal slightly phase-shifted with respect thereto. Following a subsequent digitizing of the echo curve signal E transformed into an intermediate frequency signal, such is further processed, filtered and evaluated in a microprocessor in the control/evaluation unit 27.

The electromagnetic waves are produced in the HF-unit 26 in the measurement transmitter 25, for example, as transmission pulses M with a bandwidth of 0-1.5 GHz and coupled by means of a probe coupling region 12 onto the measuring probe 9, for example, into the coaxial probe 10. The wanted echo signals N or disturbance echo signals S, traveling back due to the discontinuity of the dielectric constant $\epsilon r$ of the surrounding material, are, in turn, received in the HF-unit 26 and, preferably as above described, conditioned into a time-expanded, intermediate frequency signal. These conditioned, high-frequency measuring signals HF are, furthermore, evaluated measurements-technically and signal-technically in the control/evaluation unit 27, where they are, for example, filtered, time-transformed and smoothed. The so obtained, measured value of the fill level 2 or the entire measuring-situation-mapping, echo curve E, which represents the conditioned envelope curve formed from the superimposing of the transmission pulse M, the disturbance echo signals S and the wanted echo signal N, are, for example, forwarded via a bus interface 29 onto the fieldbus 30 and, thence, to, for example, a control station and/or other field devices. The measured value of the fill level 2 or the echo curve E can, however, also be presented on an integrated display or at an output/input unit 28 of the fill-level measuring device 1.

Energy supply of the fill-level measuring device 1 is implemented, for example, by means of a two-wire line. The additional supply line 31 for energy supply is omitted, when the fill-level measuring device 1 is a so called two-conductor measuring device, whose communication via the fieldbus 30 and supply line 31 is accomplished exclusively and simultaneously via a two-wire line. The data transmission or communication via the fieldbus 30 is effected, for example, according to the CAN-, HART-, PROFIBUS DP-, PROFIBUS FMS-, PROFIBUS PA-, or FOUNDATION FIELDBUS-standard.

Decisive for the wide applicability of a time-domain reflectometer as a fill-level measuring device 1 is insensitivity relative to application-dependent influences. This is best achieved by a single-rod probe 11, which, in comparison with other possible sensor geometries, such as, especially, a two-rod probe or a coaxial probe 10, has a much larger spatial expansion of the measuring signal. For this reason, in most cases, in the presence of product accretions on the sensor, neither disturbance echo signals S, nor the amplitude A of the transmission signal M, is significantly attenuated or the travel time t enlarged. A further advantage of the single-rod probe 11 is, that, in the case of large sensor lengths of a number of meters, no spacers are required in the measurement-active area 7. Material can deposit on spacers, or they can be damaged by vibration, temperature stress or corrosion.

FIG. 2 shows an axial, cross sectional drawing of a subsection of the TDR fill-level measuring device 1 shown in FIG. 1. The measuring probe 9 of FIG. 2 is composed, in the probe coupling region 12, of a pressure-bearing, temperature-resistant, probe-coupling housing 18. Probe-coupling housing 18 extends over the total probe coupling region 12 up to a coaxial glass feedthrough 22, where the signal feed-in of the high-frequency measuring signal HF is accomplished via a flexible coaxial line 24 and a coaxial plug 23 of the HF-unit 26. Beneath the glass feedthrough 22 are utilized fill materials 21, which are, based on experience, highly resistant and, depending on later process requirements of the measuring probe 9, also temperature-resistant. Examples of temperature-resistant fill materials 21 include, for example, ceramics, such as e.g. aluminum oxide ceramic, which, relative to the glass of the glass feedthrough 22, have not only the advantage of higher mechanical strength, but, also, because of their essentially better hydrolysis resistance, ceramics can, moreover, be exposed to the process. It is possible, however, also to use chemically resistant, synthetic materials as fill material 21 for the probe coupling housing 18 of measuring probes 9, especially in the low temperature range. For inner conductor 10*a* and/or outer conductor 10*b*, a stainless steel or, for example, Hastelloy(R) is preferably used, due to the special material strength, such as a bending strength of 20 to 60 Nm for the measuring probe 9 in the case of an inner-conductor diameter of only 10 mm. For sealing the intermediate space between the fill material 21 and the inner conductor 10*a* or the outer conductor 10*b* of the probe coupling housing 18, primary sealing elements 33 are provided, for example, in the form of graphite packing glands, elastomeric seals and/or steel-ceramic combinations. These forward-seated, sealing elements 33 serve, above all, for the protection of the gas-diffusion blocking, glass feedthrough 22 and for preventing penetration of the medium 3 into the intermediate space between the inner conductor 10*a* or outer conductor 10*b* and the fill material 21 of the probe coupling region 12. The penetration of medium into this area has the result that the measuring conditions vary due to changes in the propagation characteristic and propagation velocity of the high-frequency measuring signals HF in this area, whereby no exact measuring of the fill level 2 can be performed.

Choice of material and construction of the probe coupling region 12 of the measuring probe 9 are so accomplished, that the wave resistance or impedance of the high-frequency measuring signal HF is matched. The circuit of the HF-unit 26 in the measurement transmitter 25, as well as also the coaxial line 24, are matched to an impedance of about 50 ohm. The impedance of a single-rod probe 11 lies clearly above this value. For example, in the case of a single-rod probe 11 having a radius of about 10 mm, a wall separation from container 6 of hundred millimeters and, in the case of an in-coupling in air, an impedance of approximately 200 ohm results. With the known relationships for the reflection and transmission factors, one obtains relatively poor values for the matching of the wave resistance of the high-frequency measuring signals HF in the region of this transition from the coaxially embodied, probe coupling region 12 to the measuring probe-region 13. In the case of a single-rod probe 11, there results, thus, most often, a large, second, disturbance echo signal S2 at the transition between the coaxial probe coupling region 12 and the measuring probe-region 13 of the single-rod probe 9, this being the so-called "fiducial" echo signal. This second disturbance echo signal S2 is dependent on conditions of installation and on accretions, and is, in the case of high fill-level, moreover, superimposed on the wanted echo signal N, whereby this second disturbance echo signal S2 is only conditionally usable as a base point B for an exact measuring of the fill level 2.

Fundamentally, one strives, in constructing an impedance-matched measuring probe 9, to have the probe coupling region 12 and the delivery of the high-frequency measuring signal HF via the coaxial line 24 designed to an impedance of about 50 ohm, so that no multiple reflections and disturbance echo signals S result. If, in the probe coupling region 12 of the measuring probe 9, the diameter of the inner conductor 10*a* is made 10 mm, then there results for the outer conductor 10*b*, due to the fill material 21 located therebetween having, in the case of aluminum oxide ceramic, a large dielectric constant $\epsilon r=10$, a diameter of about 150 mm. In the case of this large diameter, however, besides the TEM-fundamental mode, already higher modes would be capable of propagation in the coaxially embodied, probe in-coupling region 12 within the fill material 21. Thus, a coaxial resonator is formed in the probe in-coupling region 21. In view of this, a smaller diameter is selected for the outer conductor diameter, which leads, it is true, to an impedance smaller than 50 ohm. This non-matched region is, however, purposely selected to be very small in its axial extension, whereby no mentionable ringing occurs in the decay. Ringing would show in the echo curve E, in that the echo signals in the echo curve E would not rapidly decay, but, instead, only slowly lose amplitude A. The ringing flank of the transmission pulse M can cover the wanted echo signal N in the measurement-active region 7, so that no usable wanted echo signal N is ascertainable at all in the vicinity of the transition from the probe coupling region 12 to the measuring probe region 13 of the measuring probe 9.

If a coaxial probe 10 is used as measuring probe 9, then, for example, a tubular structure is screwed onto the process thread 19 to provide an outer conductor 10*b* following the probe coupling region 12. Or, the outer conductor 10*b* is fixedly installed in the container 6 as a tube, such as indicated in FIG. 1, so that the inner conductor 10*a* of the measuring probe 9 is guided via an opening in the tube into the process space 34 and the process space 34 is sealed closed with the flange 20 on the measuring probe 9. Located on the outer conductor 10*b* of the coaxial probe 10 is a ventilation opening 32, in order that, with increasing medium 3 in the container 6, the gas located in the intermediate space of the coaxial probe 10 can escape into the process space 34. The matching of the impedance of the measuring probe 9 embodied as a coaxial probe 10 is other than in the case of the single-rod probe 11. The impedance jump at the transition from the probe coupling region 12 to the measuring probe region 13 is smaller in this case, so that a smaller second disturbance echo signal S2 is to be expected at this location.

Figure 3:
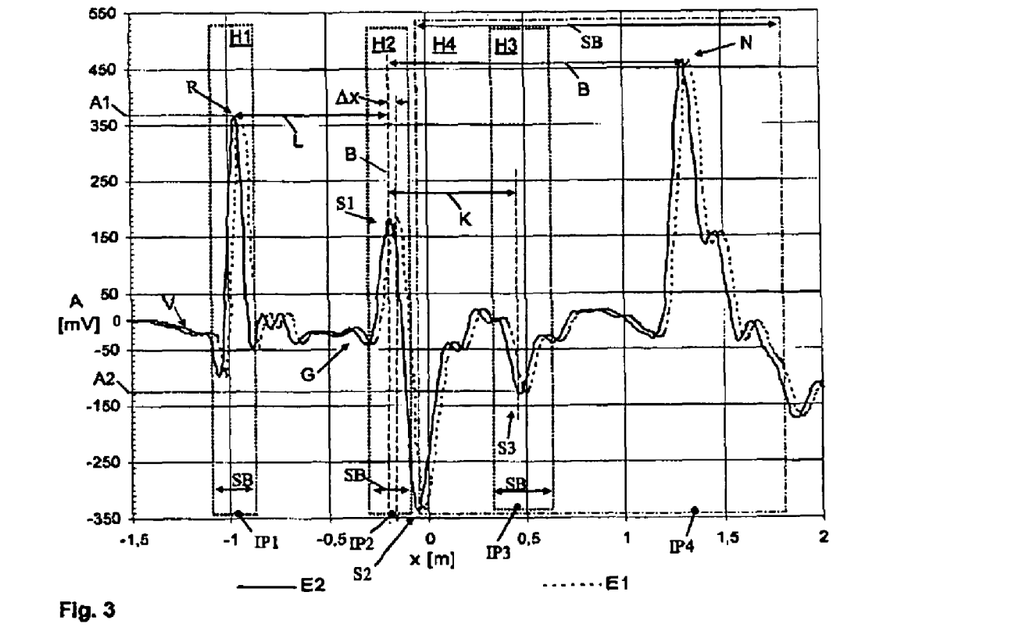
FIG. 3 a schematic drawing of a current echo curve and an optimal echo curve of a fill-level measuring device for two different measuring conditions.
Figure 4:
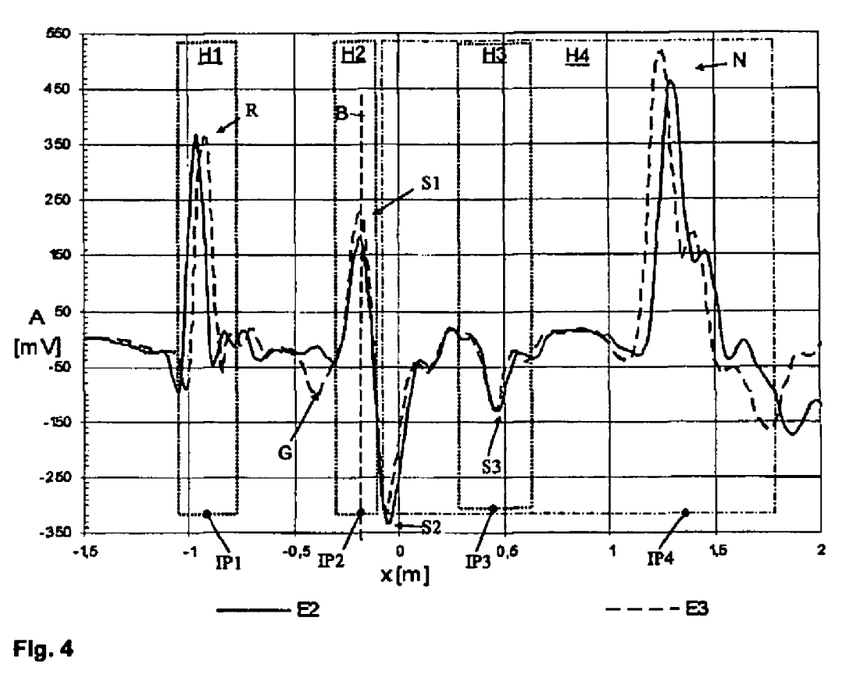
FIG. 4 a schematic drawing of a current echo curve and the echo curve shifted by a travel-time difference in the case of equal measuring conditions.

FIGS. 3 and 4 show the current, shifted and optimal echo curves E1, E2, E3 of the high-frequency measuring signal HF presented as a function of the traveled distance x in meters. These echo curves reflect various measuring situations of the fill-level measuring device 1 shown in FIG. 1. On the abscissa axis is plotted the traveled distance x of the high-frequency measuring signal HF, while the ordinate axis contains the amplitude A of the high-frequency measuring signal HF in millivolt.

FIG. 3 shows the current echo curve E1 as the short-dashed line and the echo curve E2, shifted according to the invention by a travel distance difference Δx, as the solid line. The shifted echo curve E2 has been shifted according to the method of the invention, in order to adjust and calibrate the current echo curve E1 for changes in measuring conditions or device characteristics. FIG. 3 is for a measuring situation, where, due to a leak in the sealing elements 33, for example, water, as steam, has penetrated into the intermediate space between inner conductor 10a and fill material 21 up to the glass feedthrough 22, whereby, due to the thereby lessened propagation velocity of the high-frequency measuring signals HF, the travel time t has become longer. Therefore, starting from a shared base point B, the reference echo signal R of the shifted echo curve E2 has been shifted to the left relative to the reference echo signal R of the current echo curve E1. Likewise in FIG. 4, it is to be seen that the shifted echo curve E2 is compared with the optimal, echo curve E3 recorded before start of the measuring. Thus, in FIG. 4, it can be seen, that the third disturbance echo signal S3 and the wanted echo signal N of the shifted echo curve E2 are shifted to the right relative to the optimal echo curve E3, starting from the shared base point B. This further effect is brought about by the lower propagation velocity of the high-frequency measuring signal HF due to the higher dielectric constant $\epsilon r$ of the steam in the gas phase 5 in the process space 34 of the container 6.

The following method of ascertainment of the invention is not limited only to the current, optimal or shifted echo curves E1, E2, E3, but, instead, can be applied to all echo curves E. Therefore, in the following, only the generically valid concept of an echo curve E is used. Starting from initial positions IP1, IP2, IP3, IP4 in the echo curve E, in the limits of the search window H of predetermined search width SB, transmission signal M, wanted echo signal N, reference echo signal R and additional disturbance echo signals S are sought. The initial positions IP, the symmetries of the search windows H and the search widths SB of the search windows H are fixedly predetermined by the user or manufacturer as empirical values, or stored parameters of the initial positions IP and the search widths SB of preceding measuring cycles are used. The search window H can be arranged asymmetrically about the initial positions IP, for example, in the case of the third disturbance echo signal S3, whose distance from the base point B can only become greater.

In the first search window H1, for rough determining of the base point B, a reference echo signal R is ascertained. Used as reference echo signal R can be, for example, the transmission pulse M of the high-frequency measuring signal HF produced in the HF-unit 26. Application of the transmission pulse M as reference echo signal R has the advantage, that its point in time of production can be determined quite exactly, since this has a first high amplitude A1 and a very narrow pulse width. In a first search step, dependent on the predetermined initial position IP1 of the reference echo signal R and the search width SB, the peak of the reference echo signal R and its position in the echo curve E are determined. A plausibility analysis can additionally be performed via sign and/or amplitude A. For exact determining of the wanted echo signal N, the reference echo signal R and/or the disturbance echo signals S, for example, also a parabola can be fitted to the echo curve E. The peak of this parabola then determines location and amplitude of these echo signals.

Starting from this reference echo signal R, from a predetermined distance dependent on the particular measuring probe 9, the position of the base point B in the echo curve E is roughly determined. Then, following this, in a second search window H2, starting from an initial position IP2, which is predetermined or determined on the basis of the reference echo signal R, a first disturbance echo signal S1 is ascertained. This first disturbance echo signal S1 is due to the geometric changing of the inner conductor 10a of the measuring probe 9, as caused by a disturbing element 14 in the form of a matching element 15. Matching element 15 is so embodied, that a first disturbance echo signal S1 with a second small amplitude A2 is produced and, thus, an influencing of the measuring due to multiple reflections in the echo curve E is reduced. On the basis of the determining of the first disturbance echo signal S1, a fine determining of the base point B is accomplished. In the fine determining, the position of the base point B roughly ascertained from the predetermined distance for reference echo signal R is exactly determined and correspondingly corrected. The matching element 15 is embodied in the measurement-inactive area 8 of the measuring probe 9 embodied, in order that the first disturbance echo signal S1 cannot be influenced by the medium 3, the gas phase 5, or installed objects in the container 6. At the same time, matching element 15 is placed so far toward the measurement active area 7, that the first disturbance echo signal S1 practically cannot be influenced by travel time changes in the measurement-inactive area 8. For example, such travel time changes can be caused in the probe coupling region 12 by penetrated medium, or, in the area of the coaxial line 24, by temperature changes.

The second disturbance echo signal S2, which arises from a disturbance location 14 at the transition between the measurement inactive area 8 and the measurement active area 7 of the measuring probe 9, is less suitable for diagnostic- and calibration-purposes than the first disturbance echo signal S1, since it is influenced by the installation conditions and/or the medium 3 to be measured. For example, by the installation in the nozzle or on the flange 20, the second disturbance echo signal S2 becomes smaller and time shifted. If the fill-level in the case of large DK-value $\epsilon r$ rises up to the transition between the measurement inactive area 8 and the measurement active area 7 of the measuring probe 9, the second disturbance echo signal S2 is, additionally, completely covered by the wanted echo signal N and can, no longer, be ascertained. Therefore, such fill-level measuring devices 1 can only determine the fill-level 2 up to a maximal, predetermined height, since, inside of this so-called block-distance, the fill-level 2 can no longer be ascertained exactly, due to multiple reflections and covering by the wanted echo signal N. For the above reasons, this second disturbance echo signal S2 is given no further attention and/or application for ascertaining of the base point B in the method of the invention. For determining accretion of medium 3 in this transitional region by means of a changing amplitude A, the second disturbance echo signal S2 is applicable in this method of ascertainment.

In a third search window H3, starting from the predetermined or calculated, initial position IP3, a third disturbance echo signal S3 is determined, which arises at a disturbance location 14 in the measurement-active area 7 of the measuring probe 9, such as e.g. at a cross-sectional jump by a measuring probe thickening 17 of the measuring probe 9. This measuring probe thickening 17 is so designed, that the wave resistance at the end of the measuring probe thickening 17 is only slightly lessened, and, thus, a third disturbance echo signal arises with only a small, negative amplitude A, which influences the measuring due to arising multiple reflections, at most, only insignificantly. On the basis of the ascertained distance K between the ascertained base point B and the third disturbance echo signal S3, a calibration of the propagation velocity of the high-frequency measuring signals HF on the measuring probe 9 within the gas phase 5 can be done, since the dimensions of the measuring probe 9 and the distances between the disturbance locations 14 are specified or are known.

In a fourth search region H4, starting from a predetermined or ascertained, initial position IP4, the wanted echo signal N in the echo curve E is ascertained. From the distance D between the base point B and the wanted echo signal N and the height of the container 6, the fill-level 2 of the medium 3 can be calculated as above described. The illustrated, wanted echo signal N was produced, for example, by water as medium 3.

For clarifying the arising changes of the echo signals in the echo curves E due to changing measuring conditions or device defects, two echo curves E2, E3 with different measuring conditions are presented in FIG. 4. The optimal echo curve E3, shown in FIG. 4 as a dashed line, was recorded in the case of room temperature and standard pressure in the process space 34 of the container 6. In contrast thereto, the shifted echo curve E2, drawn in FIG. 4 as a solid line, was recorded at a later point in time in the case of process conditions with temperatures at about 200 degrees Celsius and with a pressure of about 16 bar. The shifted echo curve E2 has been shifted according to the method of the invention, in order to match the echo curve E to the changes in the measuring conditions, e.g. due to medium 3 having penetrated into the probe coupling region 12. Through the ascertaining of an identical base point B in each echo curve E, thus, a shared exact basis for the different measuring situations is effected and, thus, the availability of the fill-level measuring device 1 decisively increased. With the help of the exact determining of the base point B of the echo curves E, determined at different measuring situations, a calibrating of the different echo curves E can be done, e.g. by simple shifting of the echo curves E until the base points B coincide.

From the ascertained distances D and amplitude values A of the echoes in the echo curves E, various statements concerning the measuring conditions and the device state can be derived. For example, on the basis of the distance L, curves V and/or the amplitude A of the reference echo signal R and the first disturbance echo signal S1 in the measurement-inactive area 8 of the measuring probe 9, deductions concerning the functional ability of the measuring probe 9 and the electronics in the measurement transmitter 25 can be made, since these parameters are not influenced by the process. From comparison of the two amplitudes A, or curves V, of the disturbance echo signals G of the glass feedthrough 22 in the optimal echo curve E3 and the shifted echo curve E2, deductions can be made for diagnosis—for example, deductions concerning the functional ability of the measuring probe 9 and electronics in the measurement transmitter 25. Medium 3, which has penetrated into the intermediate space between fill material 21 and inner conductor 10a, strongly attenuates the amplitude A of the disturbance echo signal G of the glass feedthrough 22, whereby this measuring situation can, thus, be easily detected. In the drawing of the shifted echo curve 2, a stretching of the echo curve E due to penetrated medium is shown. Such can either be compensated by a shifting or calibration of the echo curves E to the base point B or utilized for an error report. Due to a reduced amplitude A or a changed curve V of the reference echo signal R and/or the first disturbance echo signal S1, one could, for example, conclude, that the sensitivity of the fill-level measuring device 1 has fallen, for example, due to aging of the electronics in the measurement transmitter 25.

The echo curves E can stored by a memory function in the electronics of the measurement transmitter 25 as historical echo curves HE, for instance in a memory in the measurement transmitter 25. From this, it is possible to handle changes in the operating properties of the measuring probe 9 and the electronics in the measurement transmitter 25, or changes in the measuring conditions in the process, by a direct comparison of the separations, distance D, distance K, of the curve V and/or the amplitudes A of the reference echo signal R, the wanted echo signal N and/or the disturbance echo signals S of a historical echo curve HE, stored any point in time, with the current echo curve E1. Furthermore, from differences of the signal/noise ratio of the stored, historical echo curve HE relative to the signal/noise ratio of the current echo curve E1, information can be won concerning the functional ability and aging phenomena of the measuring probe 9 and the electronics in the measurement transmitter 25.

A further statement concerning the measuring conditions in the process space 34 can be derived from the distance x between the base point B or the first disturbance echo signal S1 in the measurement-inactive area 8 of the measuring probe 9 and the third disturbance echo signal S3 in the measurement-active area 7 of the measuring probe 9. For example, from changes of the relative amplitude A or curve V of the first disturbance echo signal S1 and/or the third disturbance echo signal S3, a diagnosis or verification of the measuring of the fill-level measuring device 1 can be performed. In the present case, the change is a changed propagation velocity caused by steam in the gas phase 5. On the other hand, it could, however, also be accretion or the mounting of the measuring probe 9 along an outer wall of a container of synthetic material. In this case, a calibration is performed, in that the distance D, particular echo signal spacings, segments K and amplitudes A in the echo curve E in the measurement-active area 8 are scaled, and/or an error report is output, in case a predetermined threshold value of the distance D, particular echo signal spacings, segments K and/or the amplitude A is succeeded, or fallen beneath. A reduced amplitude A of the third disturbance echo signal S3 could, for example, mean that, due to a process influence, e.g. in the form of accretion in the nozzle, the sensitivity of the fill-level measuring device 1 has worsened.

The calibration or diagnosis of the echo curves E can be done automatically or manually, such as, for example, in the framework of a re-occurring testing of the fill-level measuring device 1.

The invention claimed is:

1. A method for ascertaining and monitoring fill level of a medium in a container utilizing a fill-level measuring device, wherein, according to the technique of time-domain reflectometry, high-frequency measuring signals are guided via at least one measuring probe in the direction of the medium, reflected on at least one interface of the medium as wanted echo signals or on disturbance locations as disturbance echo signals, and received, the method comprising the steps of:

forming a reference echo signal in a measurement-inactive region of the fill-level measuring device either from a transmission pulse of the high-frequency measuring signal or from one of the disturbance echo signals;

forming, from the wanted echo signals, the reference echo signal and the disturbance echo signals, a current echo curve as a function of travel time or traveled distance;

locating, at least from a first disturbance echo signal and the reference echo signal, which are caused in a measurement-inactive region of the fill-level measuring device, a base point in the current echo curve; and ascertaining fill level from distance of a wanted echo signal, formed in a measurement-active region of the fill-level measuring device, from the base point in the current echo curve.

2. The method as claimed in claim 1, wherein:
a rough determining of the base point is performed based on the reference echo signal having a first, high amplitude.

3. The method as claimed in claim 1, wherein:
a fine determining of the base point is performed based on the first disturbance echo signal having a second, small amplitude.

4. The method as claimed in claim 1, wherein:
the current echo curve is shifted for locating the base point by shifting the first disturbance echo signal of the current echo curve to a predetermined initial position of the first disturbance echo signal.

5. The method as claimed in claim 4, wherein:
position and amplitude of the first disturbance echo signal and/or of the base point are stored continuously as data.

6. The method as claimed in claim 4, wherein:
from the data, behavior and changes in amplitude of the first disturbance echo signal or of the base point are ascertained and presented as a function of time.

7. The method as claimed in claim 4, wherein:
a shifted echo curve is stored as historical echo-curve cyclically, under event-control or manually.

8. The method as claimed in claim 7, wherein:
the shifted echo curve is presented together with the stored, historical echo-curve.

9. The method as claimed in claim 4, wherein:
locating of the base position, calibration of the propagation velocity and/or function-diagnosis of the fill-level measuring device are/is started manually by the operator.

10. The method as claimed in claim 4, wherein:
locating of the base position, calibration of the propagation velocity and/or function-diagnosis of the fill-level measuring device are/is started automatically in predetermined cycles or under event-control.

11. The method as claimed in claim 1, wherein:
a function-diagnosis of the fill-level measuring device is performed based on the determination of distance and/or curve of the reference echo signal and the first disturbance echo signal in the current echo curve and/or a shifted echo curve.

12. The method as claimed in claim 1, wherein:
in a measurement-active region of the fill-level measuring device, at least a third disturbance echo signal is determined in the current echo curve and/or a shifted echo curve.

13. The method as claimed in claim 12, wherein:
a calibration of propagation velocity of the high-frequency measuring signals in a gas phase above the fill level of the medium is performed based on the distance and/or based on curve between the third disturbance echo signal and the base point.

14. The method as claimed in claim 13, wherein:
the ascertained fill level is corrected based on the calibrated propagation velocity of the high-frequency measuring signals in the gas phase.

15. The method as claimed in claim 1, wherein:
the disturbance echo signals, the reference echo signal and/or the wanted echo signals are ascertained based on at least one search step in at least one predetermined search window of the current echo curve.

16. The method as claimed in claim 15, wherein:
in a first search step, the large reference echo signal is ascertained in a first search window of the current echo curve, in a second search step, the first disturbance echo signal is ascertained in a second search window of the current echo curve, in a third search step, the third disturbance echo signal is ascertained in a third search window of the current echo curve and/or, in a fourth search step, the wanted echo signal is ascertained in a fourth search window of the current echo curve.

17. The method as claimed in claim 15, wherein:
ascertainment of the disturbance echo signals, the reference echo signal and/or the wanted echo signals in the search steps in the predetermined search windows of the current echo curve occurs simultaneously.

18. The method as claimed in claim 15, wherein:
the search windows are produced in predetermined search widths and predetermined, symmetric or asymmetric arrangements about predetermined initial positions.

* * * * *